March 26, 1968     SHO TAKAYANAGI     3,374,726
BEVERAGE FERMENTATION AND STORAGE TANK OF A LARGE CAPACITY
Filed Aug. 18, 1966     3 Sheets-Sheet 1

INVENTOR.
SHO TAKAYANAGI

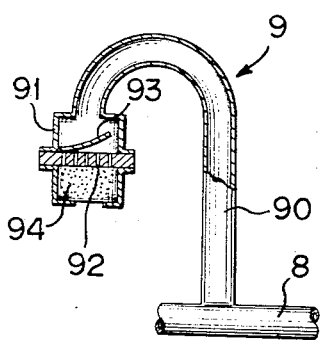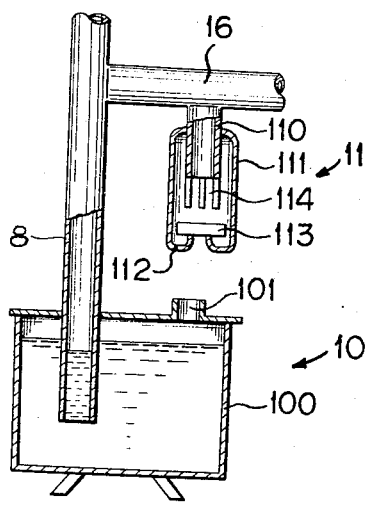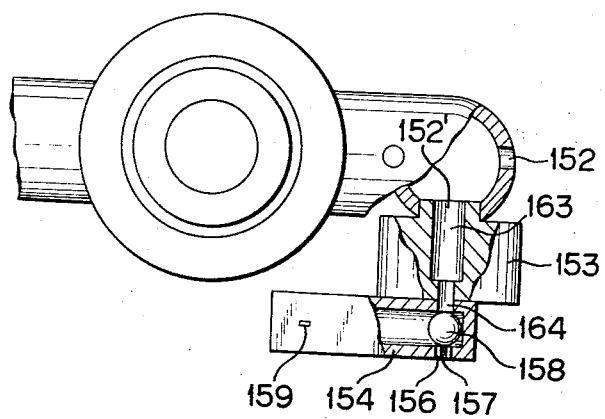

United States Patent Office 3,374,726
Patented Mar. 26, 1968

3,374,726
BEVERAGE FERMENTATION AND STORAGE TANK OF A LARGE CAPACITY
Sho Takayanagi, Tokyo, Japan, assignor to Asahi Breweries Ltd., Chuo-ku, Tokyo, Japan, a corporation of Japan
Filed Aug. 18, 1966, Ser. No. 573,280
Claims priority, application Japan, June 7, 1966, 41/3,663
2 Claims. (Cl. 99—275)

ABSTRACT OF THE DISCLOSURE

A beverage fermentation and storage tank apparatus having an externally cooled and insulated tank having an inlet and an outlet adjacent the bottom thereof, an exhaust pipe communicating with the upper portion of the tank and having pressure relief valve means for limiting the maximum pressure within the tank, one-way valve means connecting the exhaust pipe to the atmosphere for supplying air to the exhaust pipe when the pressure therein is less than atmosphere pressure, a vacuum relief valve connected with the exhaust pipe and rotary cleaning means mounted in the upper portion inside the tank.

---

The present invention relates to a beverage fermentation and storage tank and more particularly to a fermentation and storage tank of a large capacity used in brewing beer which is suitable for being installed out of doors.

It has been the generally accepted idea that a beverage fermentation and storage tank of this kind should be installed in the coolest location of a large building and kept at a low temperature. As a natural consequence, there is limit to the capacity of such a tank. This is due to the following reasons. One of them is the fact that the fermentation process in the brewing of beer and the storage of brewed beer requires, as a mandatory condition, that the tank used for these purposes be maintained at a temperature close to 0° C. Tanks of an excessively large capacity would thus require a large building to accommodate them, and a building large enough to accommodate such large tanks would require a large area, and as a consequence, an enormous sum of money was necessary for the acquisition of a large area of land and for the construction of large tanks and other auxiliary equipment, and this provided a great deal of difficulty from a practical point of view.

Another problem is that a tank of large capacity imposes a great inconvenience in cleaning the inside of the tank, in feeding liquid into the tank and in withdrawing liquid from the tank. Still another problem is that in the past the maturing of beer has been effected under a pressure ranging from 0.4 to 0.6 kg./cm.$^2$ and for this reason the tank was required to be strong enough to cope with the pressure force of at least 1 kg./cm.$^2$. Furthermore, a large tank is filled with liquid to a considerably great depth, and this results in an increased pressure of liquid, thus requiring that the tank construction material have a greatly enhanced mechanical strength to resist the increased pressure of the content.

Yet another reason is the fact that the fluctuations in the internal pressure of a tank of large capacity or the changes in the pressure of gas in such tank during the fermentation process or during the feeding of liquid could not be sufficiently controlled by the presently available auxiliary equipment.

On the other hand, conventional brewing facilities where a number of tanks of smaller capacity are installed in one building which is kept under a low temperature require more pipe lines, valve means or the like, and also require more operators. In addition, the operators had to work under a low temperature condition which necessitated the operators to wear an outfit for protection against cold, and besides, such working conditions also gave rise to many immediate problems in labor management.

It is, therefore, the primary object of the present invention to provide a beverage fermentation and storage tank which can be installed out of doors and which can have a capacity large enough to house, in one tank, a quantity of beer corresponding to that for one whole storage unit of the conventional type and also which eliminates, by the provision of novel auxiliary equipment, all of the inconveniences encountered in the operation of the conventional fermentation and storage unit.

Another object of the present invention is to provide a tank of a large capacity for being installed out of doors which can be fabricated at a reduced cost of material and which can be maintained, due to cooperation with a heat-insulating means, at a required temperature even when the tank is exposed to the sun in the mid-summer season.

Still another object of the present invention is to provide a beverage fermentation and storage tank which permits the internal pressure of the tank to be completely controlled by the provision of auxiliary equipment such as a siphon breaker, internal pressure controlling means and a vacuum breaker, and which, thereby, permits beer of an excellent quality to be brewed with safety in operation and without requiring any particular procedure departing from the conventional system.

A further object of the present invention is to provide a liquid spray and cleaning means which can be easily controlled of its rotation speed.

Yet another object of the present invention is to provide a beverage fermentation and storage tank which, by the provision of a novel liquid draining means, always permits beer of uniform quality to be drained from that portion of the beer located in the central part of the contents in the tank.

Still another object of the present invention is to provide a beverage fermentation and storage tank for installation in the open field which can be constructed in a desired size without requiring an accommodating building which would be so large as to call for a large piece of land and accordingly an enormous amount of money and which permits the operators to work in agreeable and pleasant working conditions.

Other objects, features and attendant advantages of the present invention will become apparent by reading the following detailed descriptions with reference to the accompanying drawings which are provided simply by way of example, in which:

FIG. 2 is a diagrammatic representation illustrating the manner in which a cooling jacket is mounted to the external wall face of the tank, wherein FIG. 2(b) is a fragmental cross-sectional view, while FIG. 2(a) is a fragmental plan view;

FIG. 3 is a diagrammatic cross-sectional view of a siphon breaker;

FIG. 4 is a diagrammatic cross-sectional view, on an enlarged scale, of a means for controlling the internal pressure of the tank and of a vacuum breaker;

FIG. 6 is a diagrammatic fragmental plan view, partly in section, of the spray means for cleaning the same.

Figure 1:
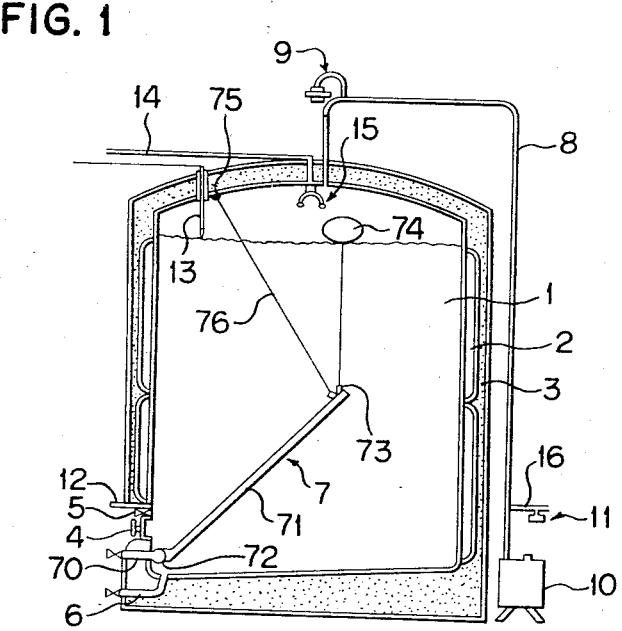
FIG. 1 is a diagrammatic representation, showing, partly in section, the outline of the tank of the present invention.
Figure 2:
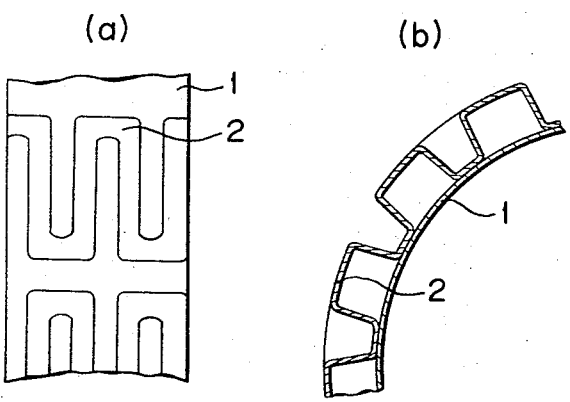

As shown in FIGURE 1, the tank 1 has a generally hollow cylindrical shape with a slightly inclined bottom face and a dome-shaped head portion. A cooling jacket 2 is mounted on the external peripheral wall surface of the tank so as to closely surround the periphery of the tank while maintaining a clearance from the surface of the periphery of the tank. The cooling jacket 2 is adapted to pass an appropriate coolant through the clearance space, as is clearly illustrated in FIG. 2(a) and FIG. 2(b). This cooling jacket is operative so as to cool the liquid contained in the tank and at the same time serves as a reinforcement for the tank walls onto which the liquid pressure is applied. Furthermore, the external periphery of the cooling jacket 2 is covered with a heat insulating layer 3 consisting of a foamed synthetic resin such, for example, as polyurethane, said layer being so disposed as to cover the entire external periphery of the tank. The numerous voids contained in the heat insulating layer effectively insulate the tank and prevent external heat from being transmitted thereinside. Due to the provision of the cooling jacket, it is possible to efficiently control and maintain the inside of the tank at a required temperature even when exposed to the direct sunlight of the mid-summer time or when placed under hot and highly humid conditions. This efficient temperature control is obtained by virtue of the cooperation between the insulating layer and the cooling jacket which is closely mounted around the external periphery of the tank. A control means 13 is located in the tank and includes a thermometer coupled to a temperature recording means and to a temperature controlling means (not shown) which is adapted to control the circulation of the coolant and thereby control the temperature of the fermenting liquid or the beverage stored in the tank.

Near the bottom and on the external peripheral surface of the tank are provided a manhole 4 and a liquid draining cock 5, and furthermore, at the lower side of the aforesaid inclined bottom surface of the tank is provided a liquid feeding pipe 6.

The member which is generally indicated by reference numeral 7 represents a movable liquid draining means which comprises a liquid draining tube 70 having an end opening through the external wall near the bottom surface of the tank and having a valve at said open end. A pivotal liquid draining tube 71 is connected at one end to said liquid draining tube 70 by means of a flexible tube 72 and has an opening at the other end thereof into the central portion of the fluid inside the tank. A pulley 73 is provided close to the upper end of the tube 71, and a rope 76 engages said pulley and is fixed at one end to a lug 75 provided on the internal wall surface of the tank in the upper end portion of the latter and is connected at its other end to a float 74 which is adapted to float on the surface of the liquid contained in the tank.

The functioning of the movable liquid draining means 7 will be self-evident from its above stated arrangement. While it is necessary in the brewing of beer to maintain all portions of the liquid of uniform quality, it is to be noted that when the tank is of a large capacity so that it has a great depth of liquid contained therein, the pressure of the liquid locating in the upper portion tends to be different from that of the liquid locating in the lower portion, and such difference in the pressure of the liquid results in a slight difference in the $CO_2$ content and in the count of the yeast cells between these portions of the liquid. By adopting the aforesaid movable liquid draining means, that is, by the arrangement of the movable liquid draining means such that the innermost open end of the movable liquid draining means is always located in substantially the central portion of the depth of the liquid by virtue of the synchronous actions of said open end and the float 74, it is possible to drain a liquid which is always uniform in quality. The tank also has mounted on the top thereof a detecting means for sensing the height of the liquid surface, the detecting means being a part of the control means 13.

An exhaust pipe 8 opens at one end into the head portion of the tank. Said exhaust pipe 8 extends vertically along the external wall of the tank in parallel thereto and opens at the other end into a pressure relief valve means 10. Also, a siphon breaker 9 communicates with the exhaust pipe 8 close to the tank, and an air supply pipe 16 communicates with said exhaust pipe at a site near the trap or pressure relief valve means 10. The vacuum breaker 11 is provided with an air supply pipe 16 in such manner that the former communicates with said exhaust pipe.

The detailed structure of the siphon breaker is illustrated in FIG. 3. The foremost open end of the branch pipe 90 is connected with the exhaust pipe 8 in such manner as to communicate with the latter. The siphon breaker is provided with a casting 91 which, in general, is of a hollow cylindrical shape. Inside the casing 91 is mounted a plate 92 having a number of holes passing therethrough, said plate being disposed so as to cover the entire transverse internal cross section of the casing and also being provided with a valve 93 which is disposed on the upper face of said plate so as to normally cover said holes. The valve is adapted to open only in a direction which will permit outside air to be brought into communication with the air located in the exhaust pipe 8. The casing 91 is further provided with a filter 94 which is disposed on the other side of said plate which is opposite to the side where said valve is located, so as to filter the air flowing into said casing.

As is illustrated in FIG. 4, the pressure relief valve means 10 comprises a water tank 100 made of a transparent material having an exhaust outlet 101 formed in the cover member. The pressure relief valve means 10 is filled with water. The lowermost end of said exhaust pipe 8 is submerged under the water and opens at a depth of about 400 mm. from the surface of the water.

The vacuum breaker 11 is of the following structure. At the lowermost end of a branch pipe 110 of said air supply pipe 16 is provided an air inlet having therein a plurality of slits 114 which extend axially of said branch pipe 110. The entire end portion of the branch pipe 110 is housed airtight by a generally hollow and cylindrical casing 111 having a flange-shape valve seat 112 formed at the bottom of the casing, defining an inwardly extending air inlet of the casing, said casing 111 also having a free valve plate 113 which normally is in engagement with said valve seat 112. This arrangement of the end portion of the branch pipe 110 avoids possible blocking of the inflow of the air due to the adherence of the valve plate 113 to the lowermost end of the branch pipe 110 per se.

Description will next be directed to the functions of the exhaust pipe 8, the siphon breaker 9, the pressure relief valve means 10 and the vacuum breaker 11. Assuming now that the liquid which is fed into the tank overflows from the tank for any reason despite the provision of the detecting means 13, the exhaust pipe 8 functions as a siphon and the excessive liquid flows outside the tank and might cause a rapid drop in the pressure inside the tank. As will be understood from the drawings, the valve 93 of the breaker 9 makes a pivotal movement in an upward direction to make an opening thereat, and the ambient air flows through said opening to arrest the function of the siphon. A drop in the internal pressure of the tank would occur not only in such a particular occasion as stated above, but also during the liquid draining operation from the tank or during the feeding of fresh liquid thereinto. Upon the occurrence of a drop in the internal pressure of the tank, said siphon breaker 9 and/or said vacuum breaker 11 work to replenish an amount of air corresponding to that which has caused the decrease in the pressure. The function of the vacuum breaker 11 will be easily understood from FIG. 4, and therefore, its description is omitted.

As is well known to those skilled in the art of this field, there develops a gas in the tank during the process of fermentation, and such gas increases the pressure in the space within the tank. Also, in case the volume of the air supplied through the air supply pipe 16 during the liquid draining process is greater than the volume of the liquid to be drained, the pressure in the space within the tank is elevated. When there occurs an increase in the internal pressure of the tank, the surplus gas which is passed through the exhaust pipe 8 presses downwardly the face of the water contained in the exhaust pipe 8 whose lowermost end portion is submerged in the water locating in the water tank 100 of the pressure relief valve means 10. When the pressure of the gas has become greater than the pressure of the water column, the gas is discharged in bubbles through the outlet 101. Means for collecting the escaping carbonic acid gas may be coupled to said outlet.

Because the internal pressure of the tank is thus controlled automatically by virtue of the cooperation between the siphon breaker, the vacuum breaker and the pressure relief valve means which are all provided on said exhaust pipe 8, the arrangement of the present invention is not only effective in controlling the temperature within the tank, in effecting satisfactory fermentation, in storing beverage and in attaining safe operation for the workers, but also has a further advantage in that in the determination of the mechanical strength of the tank including the determination of the wall thickness in designing the tank, the safety factor can be greatly reduced since the maximum potential pressures within the tank have been substantially reduced.

Description will now be made on the cleaning means. Among the conventional rotary spray and cleaning means, those of the type which are so arranged as to jet water in a direction tangential to the vortex formed by the loci of the rotating water jet pipe which are in one plane and also utilize the reaction of the jet as the driving force of rotation, are known. These devices of the prior art are convenient in that the rotation velocity cannot be altered during the rotation, and the size of the nozzle and other factors are determined primarily at the time of designing. Therefore, when the pressure of the water becomes excessively high, the nozzle is accordingly rotated at an excessively high speed, thus causing the water ejected from the nozzle to be formed into excessively fine drops which are scattered in all directions, which thus fails to accomplish the required purpose. When, on the other hand, the pressure of water is decreased, the speed of rotation is reduced and thus the tank is not properly cleaned.

The tank of the present invention is provided with a cleaning means which eliminates the foregoing inconveniences encountered where the device of the prior art is used, and more particularly, such inconveniences can be eliminated by the use of a cleaning means having means for controlling the rotation speed such that it permits one to freely change the rotation speed, which includes bringing the rotation of the nozzle to a halt.

Figure 5:
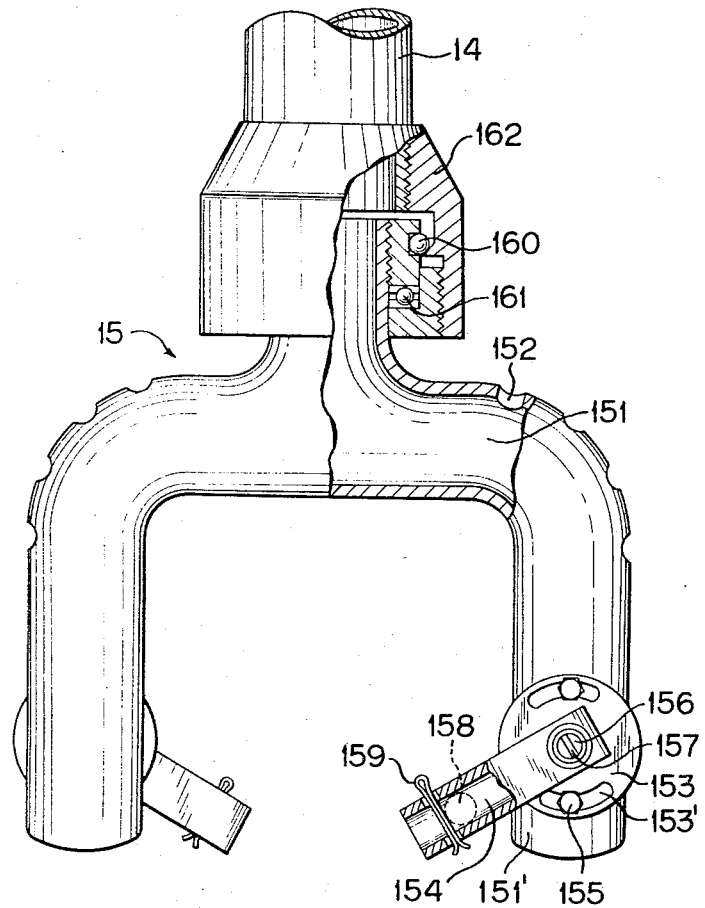
FIG. 5 is a diagrammatic cross-sectional view, on an enlarged scale, of a spray means for cleaning the internal wall surface of the tank.

In FIG. 1, the water supply pipe 14 is shown as opening into the central part in the upper end of the tank, and a cleaning means generally indicated at 15 is attached to this open end of the water supply pipe 14. As shown in FIG. 5, the cleaning means 15 includes a plurality, here two, of branch pipes 151 which are attached to the water supply pipe 14 by coupling means including an appropriate anti-friction means 160 and also a water-proof means such as, for example, a thrust bearing 161 and an O-ring made of Teflon, in such a manner that the branch pipes can effect smooth rotation without a leakage of water from the parts of the cleaning means.

Each of the two branch water jet pipes 151 is provided with a plurality of water jet openings 152 on the outer and upper side of the pipe. At the lower end of both water jet pipes are provided sidewardly opening water outlets 152' which face in opposite directions. The flow of water through said outlets 152' imparts to the jet pipes 151 a rotation force in the direction perpendicular to the axis of said water jet openings 152. (See FIG. 6).

Reference numeral 153 represents a disk member having a protruding boss portion which extends into the water outlet 152'. Said disk member is provided, along the central axis thereof, with a bore 163 formed through the disk in such manner that it communicates with the pipe 151. Two elongated slots 153' are provided in said disk member 153 close to the external periphery of the latter and extending in the circumferential direction. This disk member 153 is rotatably attached, by an appropriate clamping means such as a bolt 155, to its associated jet pipe 151 adjacent the lower end thereof.

In FIG. 5, a disk member 153 is mounted on each water jet pipe 151. This is not always necessary, and a disk member may be attached to only one of the water jet pipes 151. In the latter instance, it is not necessary to provide a water outlet 152' for that pipe to which a disk member is not attached.

To said disk member 153 is fixed a tube 154 having a hollow cylindrical shape and extending radially from the disk member. The tube 154 also extends toward the rotational axis of said water jet pipes. Said tube 154 has a closed end at the end where it is attached to said disk member 153 and, preferably, said tube is made of a rust-proof material such as stainless steel or synthetic resin. The tube 154 is open at its other (inner) end.

A rust-resistant ball 158, such as a stainless ball, which is of an appropriate weight is inserted into the hollow bore of the tube 154 through the opening end of said tube. A stopping fitting 159, such as a split cotter pin, is provided in said tube 154 to prevent the ball from escaping therefrom.

Said tube 154 is provided with a hole 164 formed through one of the side walls thereof so as to be in registry with the bore 163 of the disk member 153 and is also provided with a driving jet nozzle 156 which is formed through the outer wall on the opposite side in coaxial relation with said hole 164. In forming said driving jet nozzle 156, it is necessary that a plate 157 having a small width be retained so as to bridge the opposite edges of the nozzle diametrically in order to prevent the ball 158 from being seated continuously in the nozzle opening 156 and from becoming unslideable.

The size and the location of the hole 164 and the driving jet nozzle 156 may be selected so that the ball 158 will engage and cover the entire open edges of both the hole 164 and the driving jet nozzle 156 when the ball hits the closed end of said ball sliding tube 154.

Description will next be made on the action of the cleaning means 15. The water supplied through the water supply pipe 14 is ejected under pressure in radial directions through the jet openings 152, while at the same time, the water ejecting from the driving jet nozzle 156 causes the water jet pipe 151 to rotate, and the entire internal wall surface of the tank is thus cleaned.

The velocity of rotation of the water jet pipe 151 can be controlled by loosening the bolt 155, then rotating the disk member 153 so as to change the degree of inclination of the ball-sliding tube 154 to a desired amount, and thereafter fastening said bolt 155 tight again to fix said disk member 153.

When the water jet pipe 151 is at rest, the ball 158 tends to stay at the position indicated by the dotted line in FIG. 5. However, as the speed of rotation of the water jet pipe 151 increases, and as the component of centrifugal force applied to the ball in the direction parallel to the ball-sliding tube exceeds the component of gravity force in the same direction, the ball 158 will roll or slide along the space within the ball-sliding tube 154 to move to the closed end of said tube and to block the driving jet nozzle 156, resulting in the rotation speed of the water supply pipe 151 being reduced, and accordingly, the ball 158 returns to its initial position indicated by the dotted line. When it is desired to increase the speed of rotation of the water supply pipe 151, it is only necessary to bring the inclination of the ball-sliding tube 154 closer to the vertical line. On the other hand, when it is intended to decrease the rotation speed, it is only necessary to bring the ball-sliding tube 154 closer to the horizontal line. Thus, the ball-sliding tube containing the ball serves as a simple but reliable governor by which the water jet pipe is rotated at an appropriate speed. This arrangement completely eliminates the disadvantages of the prior art apparatus wherein the elevated pressure of the water supply caused the water jet pipe to rotate at a much increased speed so that the water was scattered therefrom in fine drops, resulting in a less effective cleaning of the tank.

The several objects which have been previously stated can be attained by the structure of the tank of the present invention. It should be understood, however, that various modifications of the present invention may be made without departing from the spirit of the present invention.

The embodiments of the invention in which an exclusive property or privilege is claimed are defined as follows:

1. A beverage fermentation and storage tank apparatus of large capacity and adapted for installation out of doors, comprising:
   a hollow generally cylindrical tank which is closed at its top and bottom and which has a liquid draining outlet and a liquid feeding inlet adjacent the bottom thereof;
   means defining a cooling jacket on the external peripheral wall of said tank;
   a heat insulating layer covering both said tank and said cooling jacket;
   an exhaust pipe having one end opening into the upper portion of said tank;
   pressure relief valve means connected to the other end of said exhaust pipe for limiting the maximum pressure within said tank;
   one-way valve means connecting the exhaust pipe with the atmosphere for supplying air to said pipe when the pressure therein is less than the atmospheric pressure;
   a vacuum relief valve operatively connected to said pipe; and
   rotary cleaning means mounted in an upper portion inside said tank and having rotation speed controlling means;

2. A beverage fermentation and storage tank apparatus of large capacity for installation out of doors according to claim 1, wherein said tank is further provided with a movable liquid draining means comprising:
   a pivotal liquid draining tube having one end pivotally connected to said liquid draining outlet and the other end opening into the liquid;
   a rope connected to said pivotal liquid draining tube; and
   a float attached to one end of said rope for raising and lowering said tube in response to the level of liquid in said tank.

References Cited

UNITED STATES PATENTS

| | | | |
|---|---|---|---|
| 213,148 | 3/1879 | Tschirgi | 137—251 |
| 2,393,518 | 1/1946 | Clarke | 99—277.2 X |
| 3,201,328 | 8/1965 | Williams | 99—276 X |

FOREIGN PATENTS

| | | |
|---|---|---|
| 237,466 | 8/1911 | Germany. |
| 436,805 | 6/1948 | Italy. |

WILLIAM I. PRICE, *Primary Examiner.*